UNITED STATES PATENT OFFICE.

KURT DESAMARI, OF ELBERFELD, AND ARTHUR ZART, OF VOHWINKEL, GERMANY, ASSIGNORS TO FARBENFABRIKEN VORM. FRIEDR. BAYER & CO., OF ELBERFELD, GERMANY, A CORPORATION OF GERMANY.

DISAZO DYE.

1,052,137.     Specification of Letters Patent.     Patented Feb. 4, 1913.

No Drawing. Original application filed July 27, 1911, Serial No. 640,780. Divided and this application filed March 13, 1912. Serial No. 683,536.

*To all whom it may concern:*

Be it known that we, KURT DESAMARI and ARTHUR ZART, doctors of philosophy, chemists, citizens of the German Empire, residing, respectively, at Elberfeld and Vohwinkel, Germany, have invented new and useful Improvements in Disazo Dye, of which the following is a specification.

The present application which is a divisional application from our application Serial No. 640780 filed July 27, 1911, concerns the manufacture and production of new azo coloring matters having most probably the following general formula:

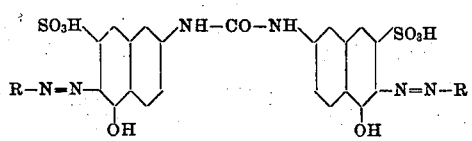

R meaning a derivative of the 2-amino-5-naphthol-7-sulfonic acid containing a heteronuclear ring:

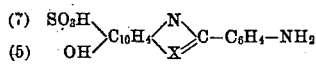

X meaning —NH—, which may be replaced by —O—, and —S—.

The new dyes are obtained by combining the diazo compounds prepared from aminophenyl-5-oxy-2-naphthimidazol-7-sulfonic acids:

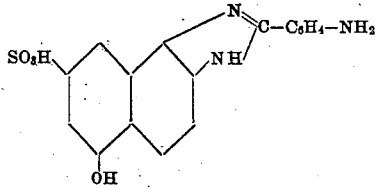

aminophenyl-5-oxy-2-naphthoxazol-7-sulfonic acids:

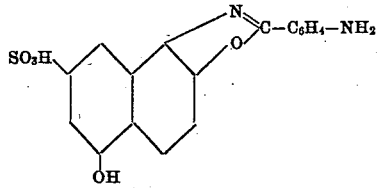

aminophenyl-5-oxy-2-naphthothiazol-7-sulfonic acids:

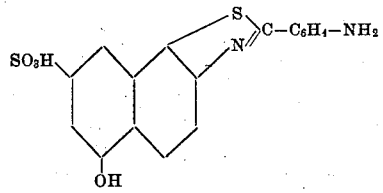

with the symmetrical urea obtained from 2-amino-5-naphthol-7-sulfonic acid:

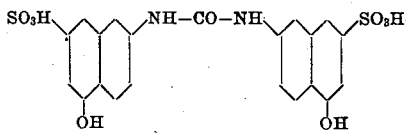

Of course two different molecules of these compounds can be used.

The new dyes are after being dried and pulverized in the shape of their alkaline salts dark powders soluble in water; yielding upon reduction with stannous chlorid and hydrochloric acid a derivative of 2-amino-5-naphthol-7-sulfonic acid containing a heteronuclear ring:

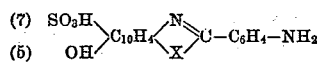

and a compound of the formula:

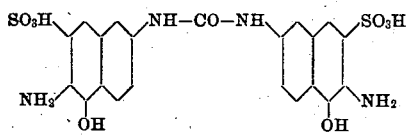

dyeing cotton red shades which on being developed with diazotized para-nitranilin change into shades fast to washing and capable of being discharged to a pure white.

The following example may further illustrate the invention, the parts being by weight:—375 parts (1 mol.) of para-aminophenyl-5-oxy-1.2-naphthimidazol-7-sulfonic acid are diazotized with 69 parts of sodium nitrite and hydrochloric acid and in the same manner 373 parts of meta-aminophenyl-5-oxy-1.2-naphthi-midazol-7-sulfonic acid are diazotized and both components are combined with 504 parts of the symmetrical urea of 2.5-aminonaphthol-7-sulfonic acid containing an excess of bicarbonate of sodium. After some time the mixture is heated and the dye is salted out with common salt, filtered off and dried.

The new dye having most probably the formula:

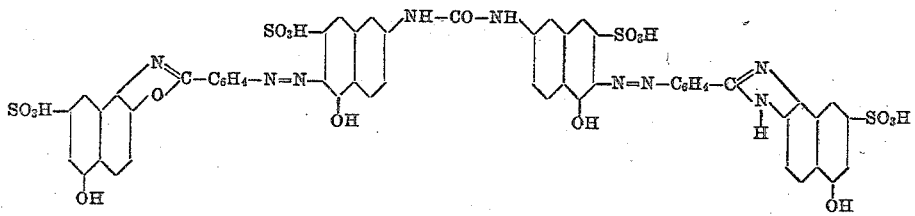

is in the shape of its sodium salt a dark powder which is easily soluble in water with a red coloration and which is soluble in concentrated sulfuric acid with a violet-red coloration. Upon reduction with stannous chlorid and hydrochloric acid it is split up into para-aminophenyl-5-oxy-1.2-naphthoxazol-7-sulfonic acid, meta-aminophenyl-5-oxy-1.2-naphthimidazol-7-sulfonic acid, and the symmetrical urea of 2.6-diamino-5-oxy-naphthalene-7-sulfonic acid. It dyes cotton red. The shade after being developed with diazotized para-nitranilin is blue-red fast to washing. It can be discharged to a pure white.

We claim:—

1. The new disazo dyestuffs which are after being dried and pulverized in the shape of their alkaline salts dark powders soluble in water; yielding upon reduction with stannous chlorid and hydrochloric acid a derivative of 2-amino-5-naphthol-7-sulfonic acid containing a heteronuclear ring and a compound of the formula:

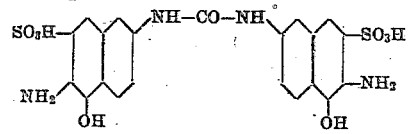

dyeing cotton red shades which on being developed with diazotized para-nitranilin change to shades fast to washing and capable of being discharged to a pure white, substantially as described.

2. The new dye having most probably the formula:

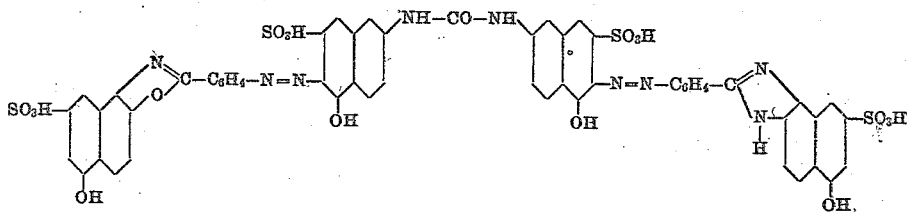

which is after being dried and pulverized in the shape of its sodium salt a dark powder soluble in concentrated sulfuric acid with a red coloration; yielding upon reduction with stannous chlorid and hydrochloric acid para-aminophenyl-5-oxy-1.2-naphthoxazol-7-sulfonic acid, meta-aminophenyl-5-oxy-1.2-naphthimidazol-7-sulfonic acid and the symmetrical urea of 2.6-diamino-5-oxynaphthalene-7-sulfonic acid, dyeing cotton red, which shade after being developed with diazotized para-nitranilin is bluish-red fast to washing which can be discharged to a pure white, substantially as described.

In testimony whereof we have hereunto set our hands in the presence of two subscribing witnesses.

KURT DESAMARI. [L. S.]
ARTHUR ZART. [L. S.]

Witnesses:
HELEN NUFER,
ALBERT NUFER.